J. B. BLAIN.
GREASE CUP.
APPLICATION FILED JUNE 13, 1919. RENEWED JULY 19, 1921.
1,390,078.
Patented Sept. 6, 1921.
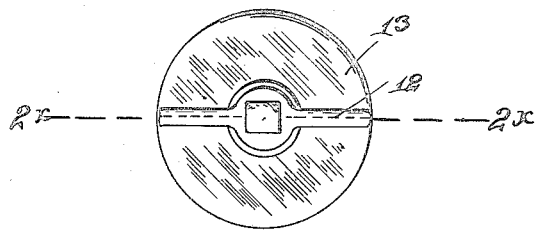
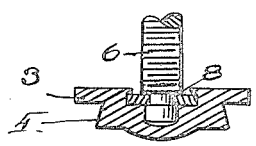
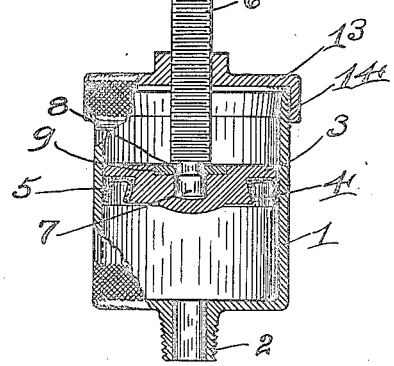
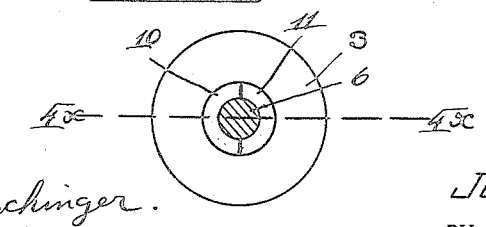
WITNESS:
Alfred E. Oschinger.
INVENTOR.
JOHN B. BLAIN.
BY
Frank Keifer
ATTORNEY.

UNITED STATES PATENT OFFICE.

JOHN B. BLAIN, OF ROCHESTER, NEW YORK.

GREASE-CUP.

1,390,078.　　　　　　　Specification of Letters Patent.　　Patented Sept. 6, 1921.

Application filed June 13, 1919, Serial No. 303,971. Renewed July 19, 1921. Serial No. 485,850.

*To all whom it may concern:*

Be it known that I, JOHN B. BLAIN, a citizen of the United States, residing at Rochester, in the county of Monroe and State of New York, have invented certain new and useful Improvements in Grease-Cups, of which the following is a specification.

The object of this invention is to construct a grease cup out of which the lubricant can be forced with great pressure without leaking.

This and other objects of the invention will be fully illustrated in the drawings, described in the specification and pointed out in the claims at the end thereof.

In the drawings,

Figure 1 is a top plan view of the grease cup and its handle.

Fig. 2 is a vertical section through the grease cup on the line 2ˣ—2ˣ of Fig. 1, the parts being shown partly broken away as well as in section.

Fig. 3 is a top plan view of the piston and section of the washer for locking the stem to it.

Fig. 4 is a section on the line 4ˣ—4ˣ of Fig. 3.

Fig. 5 is a vertical section through the piston, showing a modification of the form of the washer used for fastening the stem in the piston.

In the drawings, like reference numerals indicate like parts.

In the drawings, reference numeral 1 indicates a grease cup having a threaded nozzle 2 which is adapted to screw into an opening in the end of the shackle bolt or a king bolt of an auto or any similar device that needs lubrication.

It will be understood that shackle bolts and king bolts are hollowed out, the hole extending axially partly through, the hole being blind at one end. From the axial hole extends one or more holes radially through which the lubricant can pass to the bearing outside of the bolt. The lubricant must be forced through the bolt and into the bearing. As the load on the bearing is frequently a thousand pounds or more, it requires great pressure to force the grease through the opening into the bearing against the resistance of this weight or pressure, and this great pressure must therefore be exerted in the grease cup.

The cup must be made so it can exert great pressure and hold the grease without leaking or waste so that all of the grease may be forced into the bearing where it is desired.

It will also be understood that this grease cup is adapted for other uses and can be used in any case in which the grease must be forced into a bearing under pressure.

To secure the pressure and prevent the leaking of grease from the cup I arrange the cup and piston as follows:

The piston 3 consists of a disk having an undercut shoulder 4 formed thereon on which is carried an annular U-shaped washer 5 of leather or similar flexible material. As the washer is U-shaped it will spread out under pressure and make close contact with both the piston and the cylinder and, being undercut where it makes contact with the piston, it will hold to the piston and will be positively drawn back by the piston when the piston is moved rearwardly. Fastened to the piston is the threaded stem 6 having a reduced end 7. Between the reduced end and the threaded stem is a shouldered annular recess 8.

The piston is recessed as indicated at 9 with a shouldered annular recess having two diameters and forming a seat for the end of the piston and the retaining washer. The washer is made in two sections 10 and 11, each of which is half of a ring. The two halves of the washer are brought into engagement with the annular recess in the piston or stem and the piston and the washer sections are then moved into engagement with the recess or seat in the piston. The metal of the piston which extends above the washer is then spun or peaned over the washer to securely lock the washer in place. In this way the stem and the piston are securely fastened together by an engagement that permits the stem to move the piston both ways and avoids an opening through the piston through which grease might leak from the under side to the upper side.

To the top of the stem 6 is fastened a handle 12 by which the stem 6 may be turned. The stem passes through the top or cap 13 of the grease cup with which it has a threaded engagement. The cap also has a threaded engagement with the grease cup as indicated at 14.

By turning the handle 13 the piston is forced down in the grease cup and the grease is forced out through the nozzle. By turning the handle in the reverse direction the piston is drawn back and by unscrewing the cap 13 the piston may be removed from the grease cup and the grease cup may be refilled.

By constructing the cup in this manner a pressure of 3,000 pounds has been secured on a gage with a grease cup having a diameter of ¾" without any leaking of the grease past the piston.

I claim:

1. A cylinder and a piston therefor said piston having an annular seat, said piston being under cut on the inner side of said seat, a U-shaped packing on said seat engaging with the cylinder, said packing being held in place by the shape of the seat.

2. A piston and a stem for moving it, a stepped recess centrally located on one side of said piston, in the lower part of which recess said stem engages without passing through the piston, said stem having an annular recess therein, a tapered washer in sections adapted to engage in said annular recess and rest in the upper part of the stepped recess, the edge of the upper part of said stepped recess being spun over to fasten the washer in place.

3. A piston and a stem for moving it, a stepped recess centrally located on one side of said piston, in the lower part of which recess said stem engages without passing through the piston, said stem having an annular recess therein, a tapered washer in sections adapted to engage in said annular recess and rest in the upper part of the stepped recess, the edge of the upper part of said stepped recess being spun over to fasten the washer in place, a cylinder for said piston having a head thereon, said stem making a threaded engagement with said head.

In testimony whereof I affix my signature.

JOHN B. BLAIN.